(12) United States Patent
Gretz

(10) Patent No.: US 6,313,406 B1
(45) Date of Patent: Nov. 6, 2001

(54) CABLE SUPPORT

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 09/505,360

(22) Filed: Feb. 16, 2000

Related U.S. Application Data

(63) Continuation-in-part of application No. 09/295,082, filed on Apr. 20, 1999.

(51) Int. Cl.⁷ ........................................... H02G 3/10
(52) U.S. Cl. .................... 174/72 A; 174/135; 24/16 PB; 24/30.5 P; 248/62; 248/74.3
(58) Field of Search ................... 174/72 A, 135; 248/62, 63, 74.3; 24/16 PB, 17 AP, 18, 30.5 P

(56) References Cited

U.S. PATENT DOCUMENTS

| | | | | |
|---|---|---|---|---|
| 2,373,328 | * | 4/1945 | Morehouse | 248/62 |
| 2,974,916 | * | 3/1961 | Richey | 248/74.3 |
| 3,049,771 | * | 8/1962 | Litwin et al. | 24/16 PB |
| 3,059,359 | * | 10/1962 | Goldammer et al. | 24/16 PB |
| 3,144,695 | * | 8/1964 | Budwig | 24/17 AP |
| 3,501,814 | * | 3/1970 | Anderson et al. | 24/16 PB |
| 5,293,669 | * | 3/1994 | Sampson | 24/16 PB |
| 5,457,853 | * | 10/1995 | Klein | 24/16 PB |
| 5,685,048 | * | 11/1997 | Benoit | 24/16 PB |
| 5,745,957 | * | 5/1998 | Khokhar et al. | 24/16 PB |
| 6,073,315 | * | 6/2000 | Rasmussen | 24/16 PB |
| 6,151,761 | * | 11/2000 | Thompson | 24/16 PB |
| 6,185,792 | * | 2/2001 | Nelson et al. | 24/17 AP |
| 6,202,962 | * | 3/2001 | Snyder | 24/16 PB |

* cited by examiner

*Primary Examiner*—Dean A. Reichard
*Assistant Examiner*—Adolfo Nino

(57) ABSTRACT

An integral or unitary flexible cable support having: 1) a base for mounting on an appropriate structural member, and 2) a flexible strap integrally formed with the base, the flexible strap having a base end attached to the base and a distal end that includes a key hole shaped aperture for engaging an appropriate attachment button on the front of the base. In use, cable or wiring to be supported is placed within the flexible strap, the strap bent to encompass the wiring and the keyhole shaped aperture engaged about the attachment button. This provides a wiring support that is not easily disengaged by random movement of the wiring, but is easily disengaged by hand for removal of one or more cables or insertion of additional cables by proper alignment of the key hole shaped aperture with the attachment button.

10 Claims, 4 Drawing Sheets

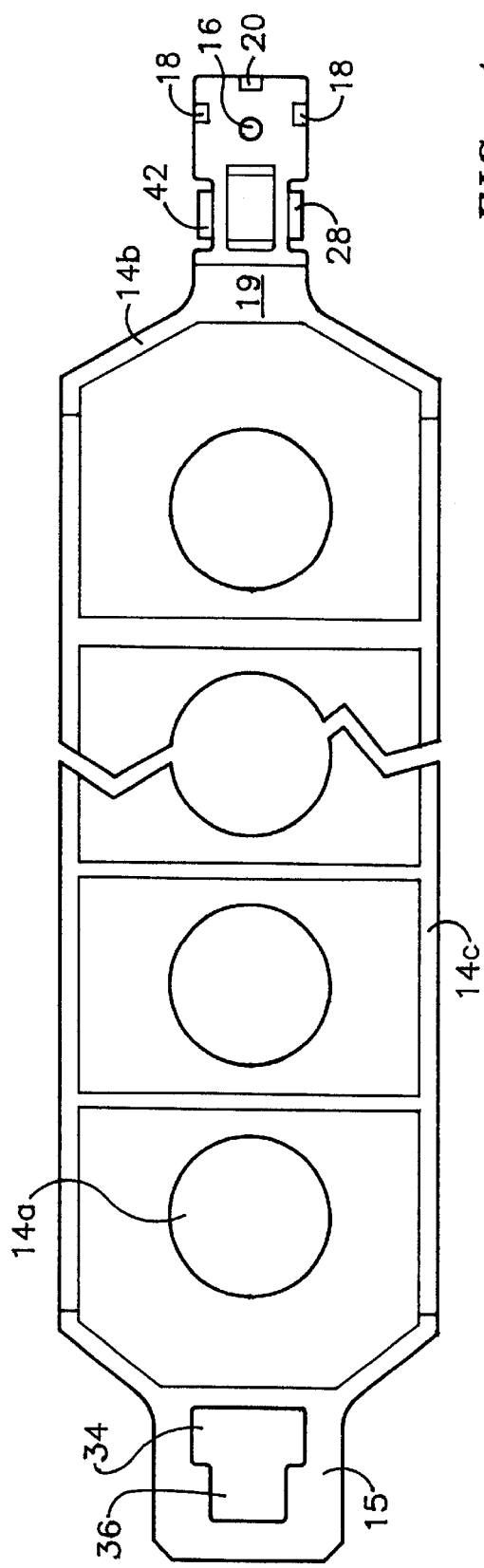
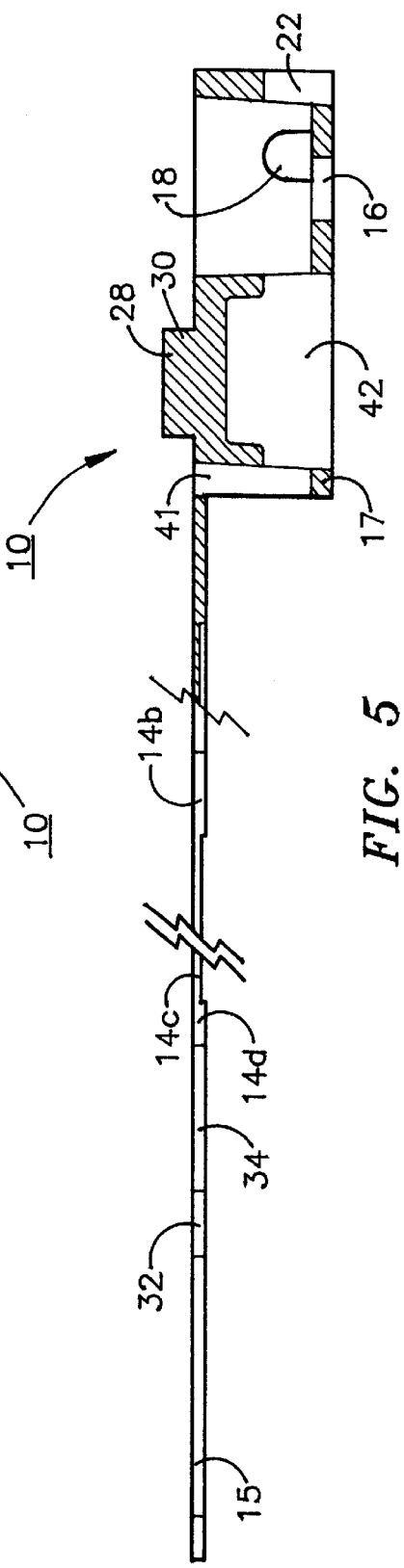
FIG. 4
FIG. 5

CABLE SUPPORT

This application is a continuation-in-part of U.S. patent application Ser. No. 09/295,082, titled "Cable Support", filed Apr. 20, 1999 in the name of Thomas Gretz.

FIELD OF THE INVENTION

The present invention relates to supports for communications cable and the like and more particularly to a flexible such supports that provide a safe and secure mounting for fiber optic and other similar cables in areas where relatively flat mounting locations are not readily available.

BACKGROUND OF THE INVENTION

With the advent and growth of computer and communications applications in the business environment, the retrofit installation of delicate and sophisticated cabling such as twisted pair and fiber optic cables has become more and more of an issue. Unlike conventional electrical wiring, such cabling cannot be abused either in its installation or use. Bending excessively, kinking, sharp bending, contact with sharp edges, etc. all can cause harm to the cable which affects its intended performance. This problem is not quite so significant in new construction where cable trays designed to receive such cabling are installed during construction to accommodate current and future needs. In retrofit applications, however, means must be provided for the easy, safe and secure installation and maintenance of such cabling.

Accordingly, a number of hangers or supports for such cabling have been designed and marketed primarily for the retrofit market. For example, U.S. Pat. No. 5,740,994 describes a cable support which is generally J-shaped and has a saddle portion which is curved around the base of the J and flat across the base of the J. Downward extending flanges on either side of the flat base of the J are provided to ease the transition of a sagging cable suspended between two such supports as the cable is laid from one side of the support, across the flat portion of the support and off of the other side thereof. Use of the cable support described in this patent requires the use of a separate cable tie across the open face of the J to secure the cable after installation.

A variety of flexible such supports have also been suggested for such use. One such device is manufactured and sold by Caddy Fasteners of Solon, Ohio. This device utilizes a flexible strap having one end thereof attached to a mounting base and the opposing or free end thereof including a rigid cross member whose exposed ends engage tabs on the mounting base when the flexible strap is folded upon itself to encompass inserted wiring. In order to tightly secure the strap to the mounting base, crimping of the mounting base incorporated tabs is necessary. While such crimping provides a secure closure of the support, removal of a wire or the insertion of another wire or wires is made more complicated by the need to "uncrimp" the tabs to permit removal of the flexible strap.

U.S. Pat. No. 5,964,434 to E. J. Lynch, Jr. issued Oct. 12, 1999 describes a fireproof cable loop forming strap of substantial width having pockets at each end to receive front and rear spreader bars that project beyond the lateral edges of the strap and are designed to engage hook tabs projecting from the face of a hanger plate or yoke for mounting. According to a preferred embodiment, the rear spreader bar is preassembled with the yoke or hanger plate so that it cannot be removed therefrom. While such a device provides a useful cable support, the use of spreader bars results in the increase in the number of parts that may be lost or become separated from the hanger prior to installation and increases the number of steps required to complete installation, since at least the front spreader bar must be inserted into its pocket prior to mounting. Additionally, the presence of spreader bars that extend beyond the lateral edges of the strap requires that a wider area be found for installation of the hanger. Since use of such devices is often in areas of very limited space, the need to find a relatively wide area into which to install the strap complete with spreader bars may be very inconvenient.

OBJECTS OF THE INVENTION

It is an object of the present invention to provide a flexible cable support structure that provides an integral cable support with rapid and easy securing of the flexible strap to its mounting without the need for crimping or other additional installation steps.

It is a further object of the present invention to provide a flexible cable support that provides a secure mounting for cables or wiring that can be readily disassembled for removal of one or more wires or the insertion of additional wires without the need to "uncrimp" or otherwise perform additional operations to unfasten the support.

SUMMARY OF THE INVENTION

According to the present invention, there is provided a unitary or integral communications or other similar cable hanging strap that comprises a base for mounting on an appropriate structural member, a flexible strap integrally formed with the base, the flexible strap having a base end attached to the base and a distal end that includes an aperture for engaging an appropriate attachment button on the front side of the base. In use, wiring to be supported is placed within the flexible strap, the strap bent to encompass the wiring and the aperture engaged about the attachment button thereby providing a wiring support that is not easily disengaged by random movement of the wiring, but is easily disengaged by hand for removal of one or more wires or insertion of additional wires.

DESCRIPTION OF THE DRAWINGS

The following Figures wherein like numerals represent like elements will better serve to illustrate the cable support of the present invention.

FIG. 4 is a rear plan view of the cable support depicted in FIG. 3.

FIG. 5 is a side view of the cable support of FIG. 3.

DETAILED DESCRIPTION

Figure 1:
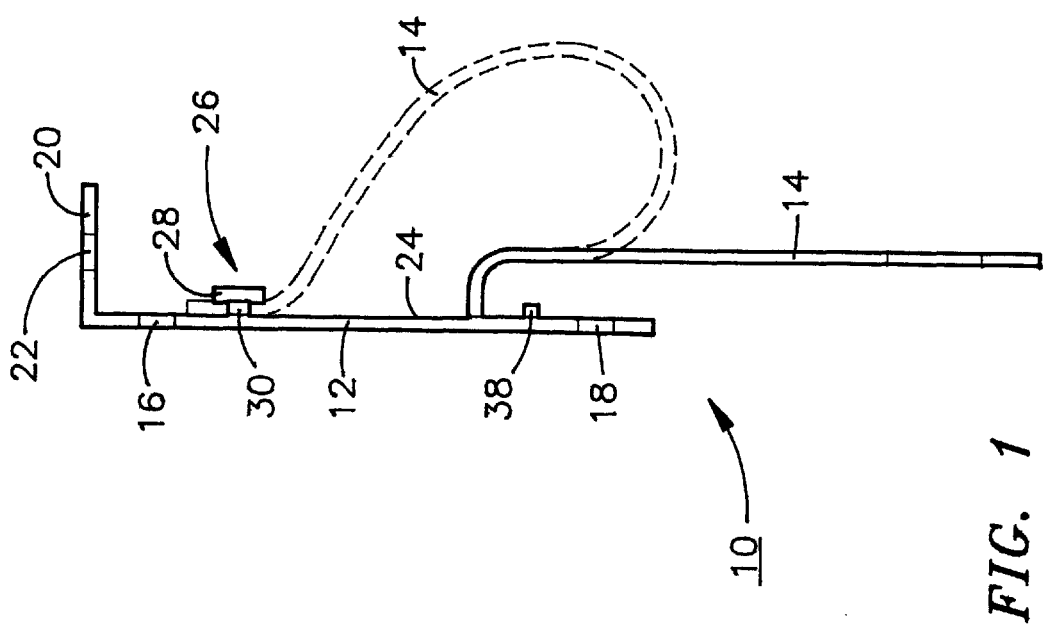
FIG. 1 is a partially phantom side view of one embodiment of the cable support of the present invention.

As shown in FIG. 1 one embodiment of the cable support 10 of the present invention comprises a base 12, having integrally formed therewith, strap 14. Base 12 includes apertures 16 and 18 for attaching base 12 and consequently cable support 10 to a surface, stud or other structural member. As used herein, the term "structural member" is meant to refer to a portion of the actual structure, i.e. a wall ceiling etc, or alternatively some member attached to the structure suitable for supporting installed cables such as a pipe, spacer or other suitable structural attachment. According to the embodiment depicted in FIG. 1, base 12 includes a flange 20 having an aperture 22 therein for mounting of cable support 10 to a ceiling or other overhead horizontal structure. It should be noted that flange 20 may be substituted with any number of alternative structures as have been used to attach similar cable support elements to a variety of structural members and that flange 20 is merely representative of one embodiment of these various attachment means.

On the front surface 24 of base 12 is a button fastener 26 having a head portion 28 and a support portion 30. The roles of these two portions will be explained more fully below.

Figure 2:
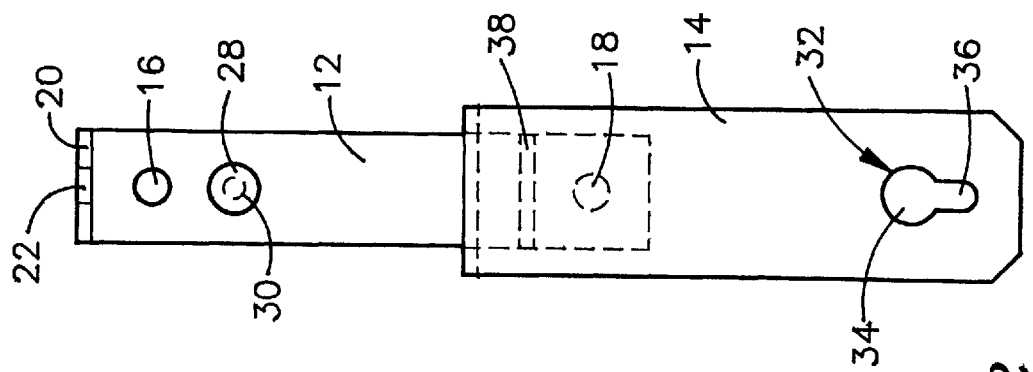
FIG. 2 is a front view of the cable support shown in FIG. 1.

As best seen in FIG. 2, a strap 14 includes near is distal end keyhole shaped aperture 32 having a wide portion 34 and a narrow portion 36. It is to be noted that the term "key hole shaped" as used herein is meant to define any aperture having at least two portions one of which is larger than the other such that the strap or element containing the "key hole shaped" aperture can engage a button by insertion of the wider portion over the head of the button and engagement of the narrower portion with a button support as will be described below. Thus, the keyhole shaped aperture may include circular, rectangular, oval portions or any combination of such shapes so long as engagement of the encompassing strap element with the button and its support is obtained. When strap 14 is flexed to provide a support or cradle for enclosed cable as shown in phantom in FIG. 2, wide portion 34 of key hole shaped aperture 32 passes over head 28 and as weight is applied downward to strap 14, narrow portion 36 engages post or button support 30. In this position, strap 14 can only be disengaged from head 28 by aligning wide portion 34 and lifting strap 14 so that wide portion 34 fits over head 28. With proper sizing of head 28, post or support 30 and wide and narrow portions 34 and 36, disengagement of strap 14 can only occur by careful manipulation of strap 14 and will not be initiated by random movement of strap 14 relative to post or support 30 and head 28.

According to a preferred embodiment, strap 14 is made of nylon and most preferably of nylon of a thickness of from about 0.025" to about 0.060". Nylon materials of this thickness while being flexible provide sufficient rigidity to assure retention of engagement aperture 32 with post 30 and head 28 even when only a minimum of weight is applied to strap 24 by cable enclosed therein.

According to a further preferred embodiment, base 12 includes on front surface 24 a stiffening flange 38 that assists in maintaining the planarity of base 12 and consequently the flatness of strap 14 when unequal forces are applied to strap 14 by enclosed, suspended cables.

Figure 3:
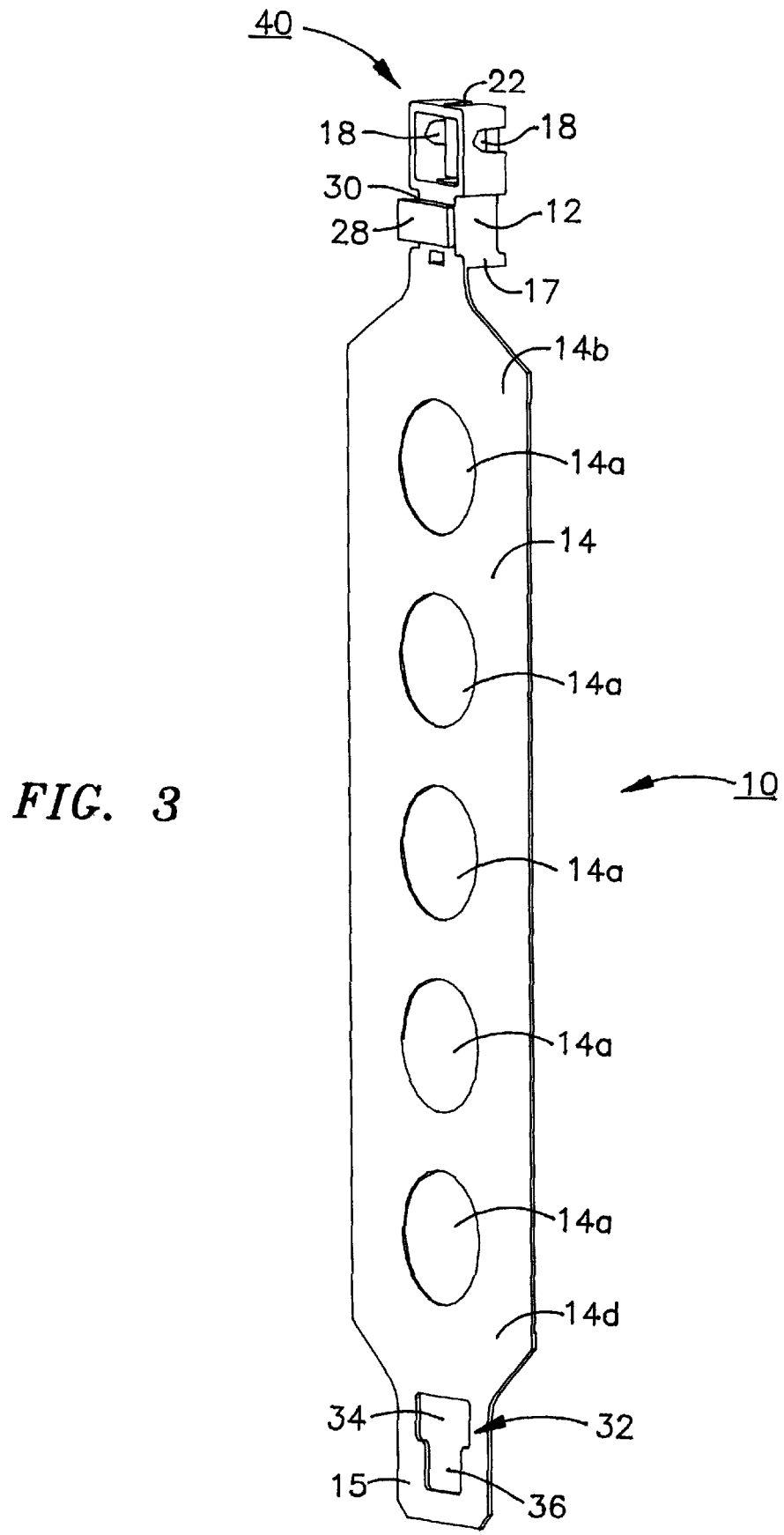
FIG. 3 is a perspective view of a second embodiment of the cable support of the present invention.

Referring now to FIG. 3 that depicts another embodiment of the cable support of the present invention, cable support 10 includes a base 12 including head 28 and post or support 30, a strap 14, apertures 16 (see FIGS. 4, 5) and 18 for attaching base 12 to a horizontal supporting structure, and at the distal end of strap 14 key hole shaped aperture 32 that includes wide portion 34 and narrow portion 36. In this case, aperture 32 is of a generally rectangular cross section. Functionally, aperture 32 engages similarly shaped rectangular head 28 and post or support 30 on base 12 in the same fashion as previously described for round post 30 and head 28 and generally round aperture 32 of FIGS. 1 and 2.

In this embodiment, while strap 14 is integrally formed with base 12, base 12 extends outwardly from upper portion 14b of strap 14 rather than strap 14 extending outwardly from base 12 as depicted in FIG. 1. Strap 14 forms an extension of the rear surface 19 of base 12. This arrangement permits the bulk of any weight applied to strap 14 by inserted cables to borne in a direct line downward from base 12 rather than at an angle as is the case with the embodiment depicted in FIG. 1. This arrangement also permits the inclusion of flange 17 below head 28 on base 12. The presence of flange 17 provides an offset that induces a less significant stress on portion 14b when aperture 32 is engaged with head 28 than would be the case with the arrangement depicted in FIG. 1.

In all of the embodiments shown in FIGS. 3 through 7, base 12 is either narrower than or the same width as strap 14 and includes a variety of apertures for attachment to a wall, ceiling or other structural element in any of the X, Y or Z directions. These attachment apertures are all provided in a hollow rectangular box-like structure 40 forming the body of base 12. Aperture 22 in the top of box-like structure 40 is accessed through a matching aperture 41 in flange 17 and the hollow interior 42 of base 12 that permits attachment to a ceiling or other horizontal structure using a suitable fastener (not shown). Apertures 18 in the side walls of box-like structure 40 are accessed through each other and allow attachment to, for example, a wall or other vertical structure by insertion of a suitable fastener (not shown). Aperture 16 in the rear wall of hollow box-like structure 42 permits attachment to a vertical structure such as a wall.

As will be apparent to the skilled artisan, any number of alternative configurations can be envisioned for base 12 to provide alternative methods for attachment to a structural support. For example, base 12 could incorporate a hook for engagement with a beam or joist etc.

In the embodiment depicted in FIG. 3, strap 14 includes holes 14a that serve primarily to reduce the amount of material required to fabricate cable support 10. Base 12 includes head 28 and post or support 30 that are engaged by aperture 32 when strap 14 is bent upon itself to form a cradle for the support of cables inserted therein. According to this embodiment, strap 14 is preferably of a width of between about 3 and about 6 inches, and most preferably about 5 inches, but as will be apparent to the skilled artisan and from the embodiments depicted herein, strap 14 may be of any desirable width consistent with the application of cable support 10.

As best shown in FIG. 5, strap 14 may be of variable thickness. In the embodiment depicted in FIG. 5 strap 14 is of three distinct thicknesses. In area 14b closest to base 12 where maximum pressure is applied during flexing a thickness of from about 0.050 to about 0.090 inches is preferred. In body 14c of strap 14 a thickness of from about 0.025 to about 0.050 inches is considered adequate, while in area 14d at distal end 15 of strap 14 that contains aperture 32 and, where maximum pressure will be applied during the support of inserted cables, a thickness of from about 0.050 to about 0.090 inches is again preferred.

Figure 6:
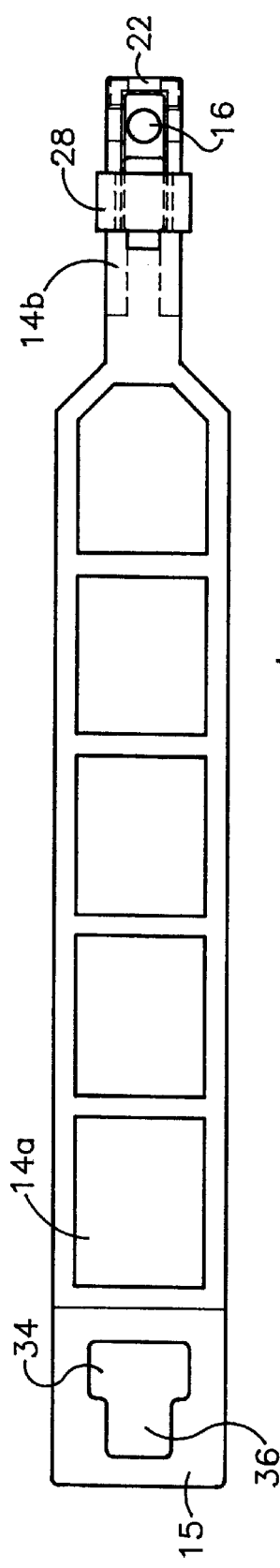
FIG. 6 is a rear plan view of yet another embodiment of the cable support of the present invention.

In the embodiment depicted in FIG. 6, strap 14 incorporates rectangular holes 14a in lieu of round holes 14a shown in FIG. 3 and 4. All other elements of cable support 10 shown in FIG. 6 are the same as those of FIGS. 3, 4 and 5.

Figure 7:
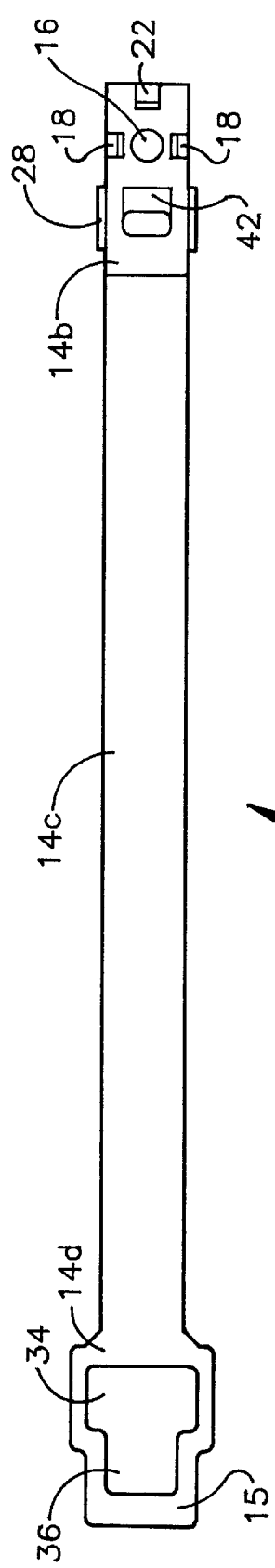
FIG. 7 is a rear plan view of a further embodiment of the cable support of the present invention.

Referring now to FIG. 7, cable support 10 is depicted with a relatively narrow strap 14 whose distal end 15 is actually wider than the main body 14c of strap 14 in order to accommodate button engagement aperture 32. All of the other elements of the embodiment of cable support 10 depicted in FIG. 6 are the same as those depicted in FIG. 3, 4, and 5.

As the invention has been described, it will be apparent to those skilled in the art that the same may be varied in many additional ways without departing from the spirit and scope of the invention. Any and all such modifications are intended to be included within the scope of the appended claims.

What is claimed is:

1. An integral cable support comprising:
   A) a base having a front and a rear surface and including at least one aperture for attachment of said base to a structure;
   B) a flexible strap having a first end attached to either said front or said rear surface and a distal end and further including a central portion between said first end and said distal end and said central portion includes a plurality of apertures along its length;
   C) a key hole shaped aperture including a wide portion and a narrow portion near said distal end; and
   D) a button on said front surface comprising a post on said front surface and a head atop said post, said head being of a greater dimension than said post;
   said wide portion being of a size that it passes over said head when said strap is bent upon itself and said narrow portion engages said post when a downward force is applied to said strap bent upon itself after said wide portion has been passed over said head.

2. The integral cable support of claim 1 wherein said strap has a thickness of between about 0.025 and about 0.060 inches.

3. The integral cable support of claim 1 further including a device for attaching said base to an overhead structural member.

4. The integral cable support structure of claim 3 wherein said strap has a thickness of between about 0.025 and about 0.060 inches.

5. The integral cable support structure of claim 3 further including a device for attaching said base to an overhead structural member.

6. The integral cable support structure of claim 5 wherein said device comprises a flange extending at a right angle from said base and including an appropriate aperture for a fastener.

7. The integral cable support structure of claim 3 further including a reinforcing flange across said front surface.

8. The integral cable support of claim 1 wherein said base end and said distal end are of a different thickness than said central portion.

9. The integral cable support of claim 1 wherein said post, said head and said distal end aperture are all generally round.

10. The integral cable support of claim 1 wherein said post, said head and said distal aperture are all generally rectangular.

* * * * *